US006401010B1

(12) United States Patent
Takahashi

(10) Patent No.: US 6,401,010 B1
(45) Date of Patent: Jun. 4, 2002

(54) COMMUNICATION SYSTEM FOR AUTOMATIC VENDING MACHINE

(75) Inventor: Toshiyuki Takahashi, Saitama-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 68 days.

(21) Appl. No.: 09/675,154

(22) Filed: Sep. 29, 2000

(30) Foreign Application Priority Data

Sep. 30, 1999 (JP) .......................................... 11-278785

(51) Int. Cl.[7] ................................................ G06F 17/00
(52) U.S. Cl. ........................................ 700/231; 700/241
(58) Field of Search ................................ 700/231, 236, 700/238, 241

(56) References Cited

U.S. PATENT DOCUMENTS

| | | | | |
|---|---|---|---|---|
| 4,117,459 A | * 9/1978 | Douglas et al. | 340/147 R |
| 4,282,575 A | * 8/1981 | Hoskinson et al. | 700/231 X |
| 4,834,231 A | * 5/1989 | Awane et al. | 700/231 X |
| 5,822,216 A | * 10/1998 | Satchell, Jr. et al. | 700/231 X |
| 6,324,520 B1 | * 11/2001 | Walker et al. | 700/231 X |

FOREIGN PATENT DOCUMENTS

JP 09128604 A * 5/1997
JP 11110620 A * 4/1999

* cited by examiner

*Primary Examiner*—Christopher P. Ellis
*Assistant Examiner*—Gene O. Crawford
(74) *Attorney, Agent, or Firm*—McDermott, Will & Emery

(57) ABSTRACT

A main control section 1 is connected through a synchronous signal line 8 to a coin distinguishing control unit 2 and a bill distinguishing control unit 3, and is connected through a synchronous signal line 9 to a customer service control unit 4 and a vending control unit 5. As a result, according to an indication by the main control section 1, the coin distinguishing control unit 2 and the bill distinguishing control unit 3 communicate with the main control section 1 at a speed of 4800 bps when the synchronous signal line 8 is activated, and the customer service control unit 4 and the vending control unit 5 communicate with the main control section 1 at a speed of 19200 bps when the synchronous signal line 9 is activated. The synchronous signal line 8 for the coin distinguishing control unit 2 and the bill distinguishing control unit 3 and the synchronous signal line 9 for the customer service control unit 4 and the vending control unit 5 are independent of each other, whereby both can not be responsive simultaneously, and such defect that the subordinate control units having different communication speed in the subordinate control section are erroneously responsive can be prevented.

5 Claims, 3 Drawing Sheets

COMMUNICATION SYSTEM FOR AUTOMATIC VENDING MACHINE

BACKGROUND OF THE INVENTION

1. Field of the invention

The present invention relates to an automatic vending machine, and more particularly, relates to a communication system of automatic vending machine suitable for reducing the time necessary for the communication between a main control section and a subordinate control section which includes a plurality of subordinate control units.

2. Description of the related art

A control of operations from a money slotting to an item transportation in an automatic vending machine is realized by a main control section for controlling a subordinate control section including a plurality of subordinate control units which share control functions of the automatic vending machine.

FIG. 1 is a block diagram showing a communication system of conventional automatic vending machine. In FIG. 1, a main control section 1 works for controlling all functions of the automatic vending machine and has ROM 1*a*, CPU 1*b* and RAM 1*c* therein. The ROM 1*a* is a non-volatile memory in which a program order for controlling a subordinate control section as described below is stored, and may be a mask ROM in which data is printed during the manufacturing steps, an EPROM in which data is repeatedly written and read out by erasing it under an ultraviolet ray and a EEPROM including a flash ROM in which data is repeatedly written and read out by erasing it under an electricity. The CPU 1*b* contains a program counter (PC) which designates an address of the ROM 1*a*, an instruction decorder (IDEC) which decodes an read-out order of the ROM 1*a*, an arithmetic and logic unit (ALU) which carries out logical arithmetic, a temporary storing register (ACC), etc., and can totally control a subordinate control section according to a result which is obtained by decording the read-out order of the ROM 1*a*. A RAM 1*c* is a volatile memory such as SRAM in which various data obtained from the subordinate control sections as the decoded result is stored. The subordinate control section includes a coin distinguishing control unit 2, a bill distinguishing control unit 3, a customer service control unit 4 and a vending control unit 5, each of which contains a ROM, a CPU and a RAM similar to the main control section. The coin distinguishing control unit 2 can control a coin mechanism which discriminates a kind of coins inserted therein. The bill distinguishing control unit 3 can control a bill distinguishing mechanism which discriminates a kind of bill inserted therein. The customer service control unit 4 can control a light-up of item selection button, a sold out sign, an on-sale sign, a vending stop sign, a change exhaustion sign and a sign of inserted bill amounts and coins which are represented on a customer service panel of the vending machine. The vending control unit 5 can control a vending mechanism which transports the item on demand by customers. The main control section is connected to the subordinate control section including the coin distinguishing control unit 2, the bill distinguishing control unit 3, the customer service control unit 4 and the vending control unit 5 by a data input/output line 6 (solid line) and a synchronous signal line 7 (broken line). That is, the coin distinguishing control unit 2, the bill distinguishing control unit 3, the customer service control unit 4 and the vending control unit 5 are changed from disable condition to enable condition by the change of synchronous signal from the main control section, whereby the data is input or output in between the main control section and each of them.

A master slave type automatic vending machine, in which the control of operations from a money slotting to an item transportation is carried out by a main control section for controlling a subordinate control section including a plurality of control units, is disclosed in Japanese Patent Publication (unexamined) 319934/97.

However, if the synchronous signal is passed through the synchronous signal line 7, all of the plural subordinate control units (the coin distinguishing control unit 2, the bill distinguishing control unit 3, the customer service control unit 4 and the vending control unit 5), which are defined as the subordinate control section in the invention, are changed to the enable condition, simultaneously, regardless of necessity for subordinate control operations. This is because the data input/output line 6 and the synchronous signal line 7 are composed of a common line. Therefore, in case that a data communication is carried out at a communication speed A (for example, 4800 bps) which is the same communication speed as the main control section between the main control section and the subordinate control section, the above defects are resolved by the fact that only a specific control unit in the subordinate control section is responsible. For example, a pass code specifically defined to each of the plural control unit is added to a first line of its communication data.

In the case, if data communication is carried out at a communication speed B (for example, 19200 bps) in only a specific subordinate control unit using the pass code, the other subordinate control unit can not recognize its own pass code, and if data communication is carried out at a communication speed A, the specific subordinate control unit can not recognize its own pass code. As a result, it occurs such problem that the specific subordinate control unit and the other subordinate control unit work simultaneously and incorrectly.

SUMMARY OF THE INVENTION

It is an object of the invention to provide an automatic vending machine in which a communication is carried out without erroneous operations between the subordinate control units.

It is another object of the invention to provide a communication system for an automatic vending machine in which a communication is carried out without erroneous operations between the subordinate control units.

The objects of the invention can be achieved by a communication system in automatic vending machine which comprises a subordinate control section including a plurality of subordinate control units which share control functions of the automatic vending machine, a main control section for controlling the subordinate control section, a data input/output line carrying out transmission and reception of data, and a synchronous signal line capable of carrying out transmission and reception of data, said main control section being independently connected to the plurality of subordinate control units through a plurality of synchronous signal lines which have a different communication speed from each other. According to the invention, the defects that the subordinate control units having different communication speed in the subordinate control section are erroneously responsive can be prevented.

In the communication system of the invention, a specific subordinate control unit is connected to a first synchronous line and the other subordinate control unit is connected to a second synchronous line, and the communication speed of the specific subordinate control unit and the other subordinate control unit is different from each other. According to the embodiment of the invention, the communication in the automatic vending machine can be done without any limitation, because the communication speed of the specific subordinate control unit is independent of that of the other subordinate control unit.

In the communication system of the invention, the communication speed of the specific subordinate control unit or the other subordinate control unit is increased. According to the embodiment of the invention, the communication time between the main control section and the subordinate control section during a series of processing is reduced.

In the communication system of the invention, the specific subordinate control unit is a coin distinguishing control unit capable of controlling a coin mechanism and a bill distinguishing control unit capable of controlling a bill mechanism, and the other subordinate control unit is a customer service control unit capable of controlling at least customer service mechanism and a vending control unit capable of controlling a vending mechanism. According to the embodiment of the invention, the communication in the customer service control unit and the vending control unit can be done without any limitation, because the communication speed of the customer service control unit and the vending control unit does not depend upon that of the coin distinguishing control unit and the bill distinguishing control unit.

In the communication system of the invention, the communication speed of the customer service control unit and the vending control unit is faster than that of the communication speed of the coin mechanism control unit and the bill distinguishing control unit. According to the embodiment, the communication time between the main control unit and the customer service control unit or vending control unit is less in a series of operations from a money slotting to an item transportation in an automatic vending machine.

DESCRIPTION OF THE PREFERRED EMBODIMENTS

Figure 1:
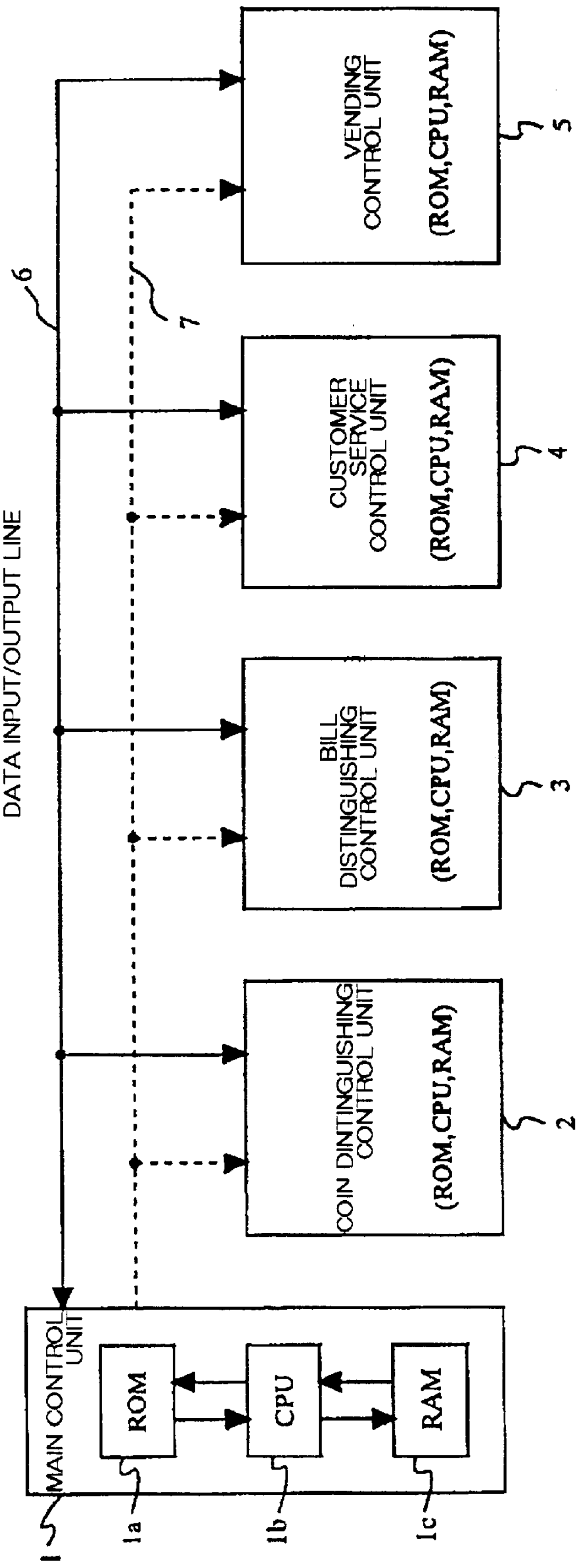
FIG. 1 is a block diagram showing a communication system of conventional automatic vending machine.

The invention will be explained in more detail referring to the drawings.

Figure 2:
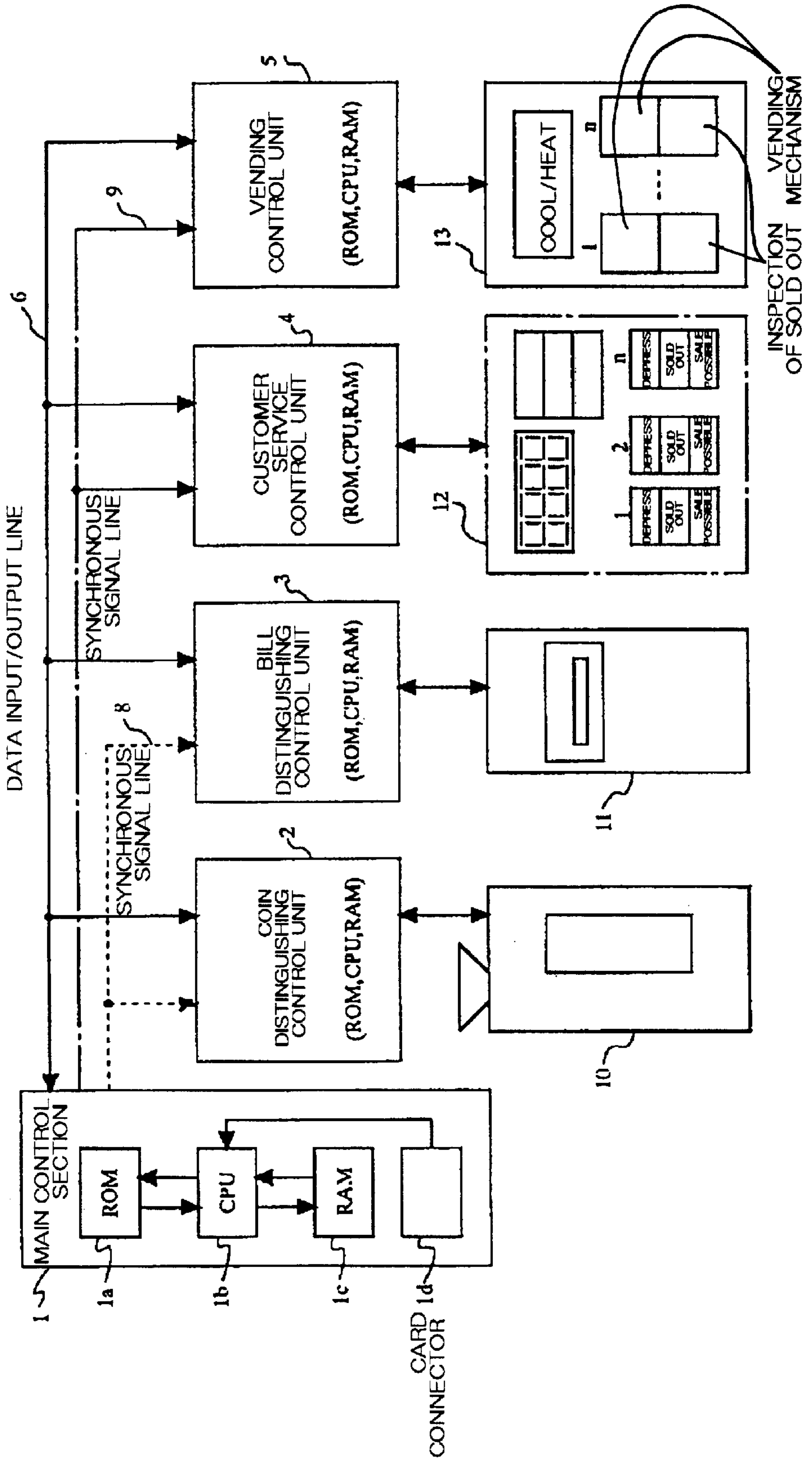
FIG. 2 is a block diagram showing a communication system of automatic vending machine in the invention.

In FIG. 2, a non-volatile memory in which a program order is rewritable is used as a ROM for the vending control unit 5 which is one of the plural subordinate control units, so that change in the vending mechanism (for example, change of the number of items or change of the number of columns) may be done. In case that the program order in the ROM of the vending control unit 5, a memory card (not shown) in which a rewritable program order is stored is inserted in a card connector 1*d* of the main control section 1. For example, a potential condition (electric source or connection to earth) of a specific terminal in the card connector 1*d* is supplied to CPU 1*b* as an outside cut-in request signal, and contents of the memory card are written through the data input/output line 6 in the ROM of the vending control unit 5 by using a particular communication protocol. The other subordinate unit does not work erroneously only in the case, because the particular communication protocol is used.

The main control section 1 and the coin distinguishing control unit 2, and the main control section 1 and the bill distinguishing control unit 3 are connected to each other by the synchronous signal line 8 shown by the broken line in FIG. 2. The main control section 1 and the customer service control unit 4, and the main control section 1 and the vending control unit 5 are connected to each other by the synchronous signal line 9 shown by the chain line in FIG. 2. Since the synchronous signal lines 8 and 9 are independent signal line, respectively, the coin distinguishing control unit 2 and the bill distinguishing control unit 3 are synchronously communicated at the communication speed A (for example, 4800 bps) , and the customer service control unit 4 and the vending control unit 5 are communicated at the communication speed B (for example, 19200 bps) which is faster than the communication speed A. Therefore, the communication operations do not overlap between the coin distinguishing control unit 2 or the bill distinguishing control unit 3 and the customer service control unit 4 or the vending control unit 5. The communication regulation with respect to automatic vending machines in Japan prohibits to change the communication speed A, which legislates the communication speed of the coin distinguishing control unit 2 or the bill distinguishing control unit 3.

A coin distinguishing device 10 is provided with a change exhaustion sensor to inspect an exhaustion of change, and works for receiving the coins inserted in a coin slot, and if necessary, returning the change from a change return opening to customers. The coin distinguishing control unit 2 controls the coin distinguishing device 10, and works for selecting a kind of the coins to be inserted, calculating the number of the coins per a sort of them, collecting them in a cash box and paying the change.

A bill distinguishing device 11 is, similar to the coin distinguishing device 10, is provided with a change exhaustion sensor to inspect an exhaustion of change, and works for receiving the bill inserted in a bill slot, and if necessary, returning the change from a change return opening to customers. The bill distinguishing control unit 3 controls the bill distinguishing device 11, and works for selecting a kind of the bill to be inserted, calculating the number of the bill per a sort of them, collecting them in a cash box and paying the change. The coin distinguishing control unit 2 and the bill distinguishing control unit 3 start their distinguishing operation immediately after the coins and/or bill are inserted in the vending machine.

The customer service section 12 is provided with a plurality of selection buttons to select the items installed corresponding to each column, an on-sale lamp and sold-out lamp which are installed on the selection buttons and by which on-sale and sold-out are indicated, and an indicator to indicate on-sale, sold-out and exhaustion of change. The customer service control unit 4 inspects the selection button to be depressed by customer from the plural selection buttons in the customer service section 12, and transmits the signal from the button to be depressed to the main control section 1. After total amount of the coins and bill, which is calculated by the main control section 1 based on the data relating to the number of the coins and bill per a sort of them to be inserted, is indicated on the customer service control unit 4, amount of the change, which is the difference of the total amount and the sales amount of the item to be purchased, on-sale, sold-out and exhaustion of change are indicated on indicators of the customer service control unit 4. Also, the on-sale lamp and the sold-out lamp are put on by the customer service control unit 4.

The vending section 13 is provided with plural lines of a vending mechanism (column) to hold the items, a sold-out sensor to inspect the sold-out of the items, a cooling device to cool the items, a heating device to heat the items and an item take-out mechanism to transport the items to be designated from the column to an item take-out opening. The vending control unit 5 controls the vending section 13 and transports the item to be designated by customers from the column to an item take-out opening.

A series of vending operations from the money slotting to the item transportation will be explained below. The coin distinguishing control unit 2 and the bill distinguishing control unit 3 start their control operation when the synchronous signal is supplied from the synchronous signal line 8. On the other hand, the customer service control unit 4 or the vending control unit 5 start their control operation when the synchronous signal is supplied from the synchronous signal line 9. The control operation of the coin distinguishing control unit 2 and the bill distinguishing control unit 3 is carried out independent of the control operation of the customer service control unit 4 or the vending control unit 5. Further, the CPU 1*b* in the main control section 1 can control an activation timing of the synchronous signal lines 8 and 9 in response to the sequence of the vending operations.

First of all, when a certain amount of coins (e.g. 200 yen) is inserted in the coin slot of the automatic vending machine, the number of the coins to be inserted is discriminated per a sort of coins and the inspection data is transmitted to the main control section 1 by the coin distinguishing control unit 2. In this case, another data that the number of the bill to be inserted is none (zero) is transmitted to the main control section 1 by the bill distinguishing control unit 3. (Step 1)

The inserted amount is calculated based on the number of the coins to be inserted per a sort of coins and is transmitted to the customer service control unit 4 by the main control section 1. (Step 2)

The customer service control unit 4 controls the customer service section 12, indicates the inserted amount of the coins to be inserted, and puts on the on-sale lamp or the sold-out lamp per the selection button. (Step 3)

When the selection button on which the on-sale lamp is put on is depressed, the customer service control unit 4 inspects the selection button to be depressed and transmits the inspected data to the main control section 1. (Step 4)

The main control section 1 transmits an indication for transporting the item to the vending control unit 5, transmits an indication for returning the change to the coin distinguishing control unit 2 if the change exists (i.e. 80 yen is returned as the change when 200 yen is inserted for 120 yen of the item), and transmits an indication for flicker of the lamp of the selected button during the transportation of the item to the customer service control unit 4. (Step 5)

The vending control unit 5 controls the vending section 13 and transports the item to be purchased from the column to the item take-out opening. (Step 6) Also, the coin distinguishing control unit 2 controls the coin distinguishing device 10 and returns the change from the change return opening for coins. (Step 7) Further, the customer service control unit 4 controls the customer service section and make the on-sale lamp of the selected button flikering during the transportation of the item. (Step 8) Steps 6, 7 and 8 are treated in parallel.

The vending control unit 5 inspects termination of the item transportation in the vending section 13 and transmits the inspected data to the main control section 1. (Step 9) And, the coin distinguishing control unit 2 inspects termination of the change return operation in the coin distinguishing device 10. (Step 10)

The main control section 1 transmits an indication for stopping the flicker of the selected button to the customer service control unit 4. (Step 11)

The customer service control unit 4 controls the customer service section 12, stops the flicker of the selected button and puts off the lamps of all selection buttons. (Step 12)

Figure 3:
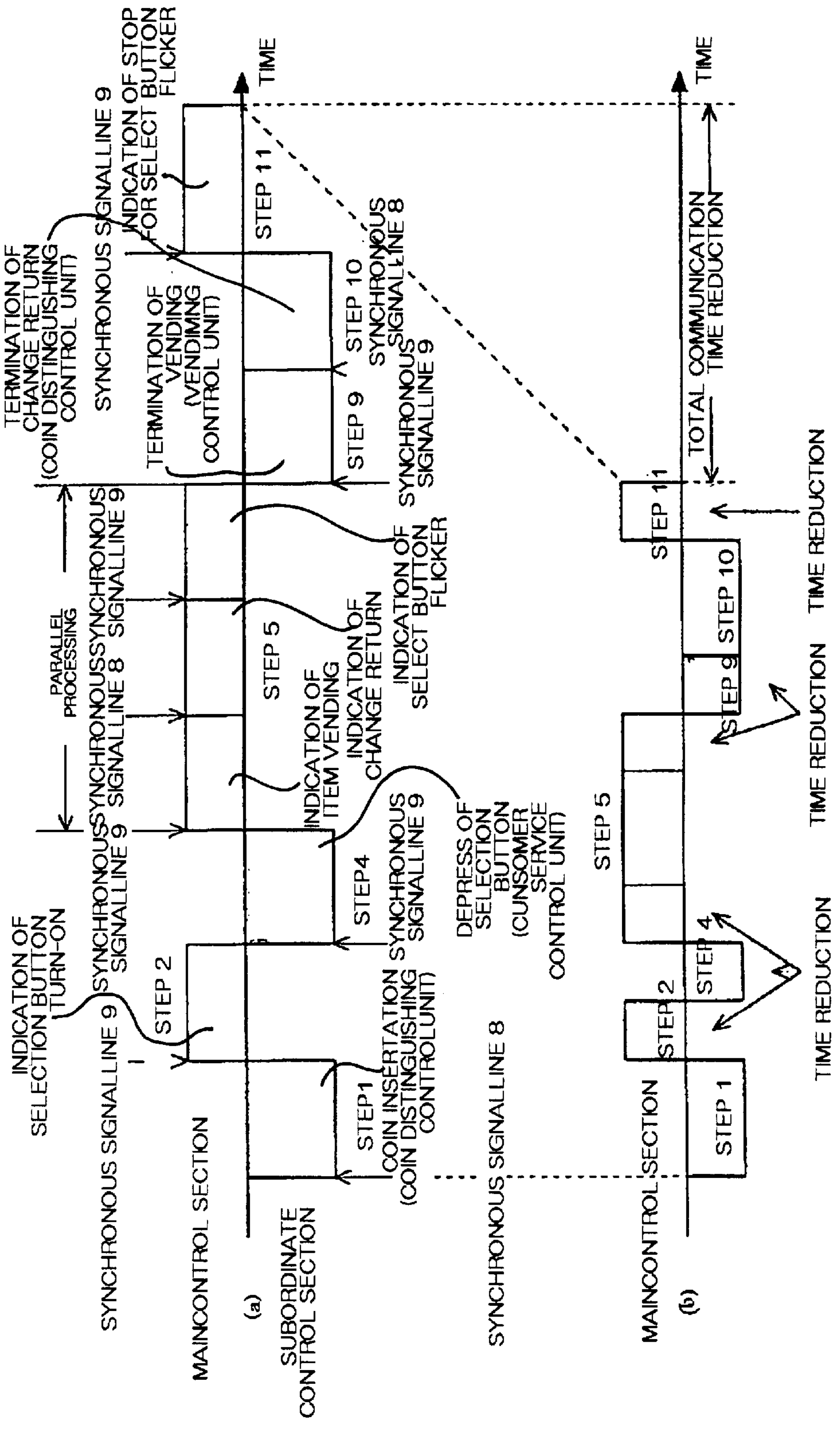
FIG. 3 is a drawing which shows a communication sequence between a main control section and a subordinate control section composed of a plurality of subordinate control units.

The sequence with respect to the communication between the main control section 1 and the subordinate control section in Steps 1 to 12 is shown in FIG. 3. According to the embodiments of the invention, an indication time 5*a* for sales of items in Step 5, an indication time 5*c* for turning the lamp of the selected button on and off in Step 5, and a stopping time for turning the lamp of the selection buttons on and off in Step 11 as shown in FIG. 3 (*a*) can be reduced as shown in FIG. 3 (*b*). Thus, the communication time can be reduced and the communication can be sufficiently done.

The number of communication lines between the main control section and the subordinate control section shall be eight (8) lines or less by the regulation in Japan. At present, it is usual to use six (6) lines that are an electrical source for 24 volts , an electrical source for 9 volts, a line connected to the earth, a data input line, a data output line and a synchronous signal line, and therefore, one synchronous signal line is added and content of program of ROM 1*a* in the main control section is modified, in case that the embodiment of the invention is implemented.

As is apparent from the above description, the following advantages can be obtained according to the invention.

The communication system in automatic vending machine comprises a subordinate control section including a plurality of subordinate control units which share control functions of the automatic vending machine, a main control section for controlling the subordinate control section, a data input/output line carrying out transmission and reception of data, and a synchronous signal line capable of carrying out transmission and reception of data, said main control section being independently connected to the plurality of subordinate control units through a plurality of synchronous signal lines which have a different communication speed from each other. According to the invention, the defects that the subordinate control units having different communication speed in the subordinate control section are erroneously responsive can be prevented.

In the communication system of the invention, a specific subordinate control unit is connected to a first synchronous line and the other subordinate control unit is connected to a second synchronous line, and the communication speed of the specific subordinate control unit and the other subordinate control unit is different from each other. According to the embodiment of the invention, the communication control in the automatic vending machine can be done without any limitation, because the communication speed of the specific subordinate control unit is independent of that of the other subordinate control unit.

In the communication system of the invention, the communication speed of the specific subordinate control unit or the other subordinate control unit is increased. According to the embodiment of the invention, the communication time between the main control section and the subordinate control section during a series of processing is reduced.

In the communication system of the invention, the specific subordinate control unit is a coin distinguishing control unit capable of controlling a coin mechanism and a bill distinguishing control unit capable of controlling a bill mechanism, and the other subordinate control unit is a customer service control unit capable of controlling at least customer service mechanism and a vending control unit capable of controlling a vending mechanism. According to the embodiment of the invention, the communication in the customer service control unit and the vending control unit can be done without any limitation, because the communication speed of the customer service control unit and the vending control unit does not depend upon that of the coin distinguishing control unit and the bill distinguishing control unit.

In the communication system of the invention, the communication speed of the customer service control unit and the vending control unit is faster than that of the communication speed of the coin mechanism control unit and the bill distinguishing control unit. According to the embodiment, the communication time between the main control unit and the customer service control unit or vending control unit is reduced in a series of operations from a money slotting to an item transportation in an automatic vending machine.

What is claimed is:

1. In a communication system for an automatic vending machine comprising a subordinate control section including a plurality of subordinate control units which share control functions of the automatic vending machine, a main control section for controlling the subordinate control section, a data input/output line carrying out transmission and reception of data, and a synchronous signal line capable of carrying out transmission and reception of data, both lines being connected between said main control section and said subordinate control section, said main control section being independently connected to the plurality of subordinate control units through a plurality of synchronous signal lines which have a different communication speed from each other.

2. The communication system for an automatic vending machine according to claim 1, wherein a specific subordinate control unit is connected to a first synchronous line and the other subordinate control unit is connected to a second synchronous line, and the communication speed of the specific subordinate control unit and the other subordinate control unit is different from each other.

3. The communication system for an automatic vending machine according to claim 2, wherein the communication speed of the specific subordinate control unit or the other subordinate control unit is increased to reduce a necessary time for a series of processing.

4. The communication system for an automatic vending machine according to claim 3, wherein the specific subordinate control unit is a coin distinguishing control unit capable of controlling a coin mechanism and a bill distinguishing control unit capable of controlling a bill mechanism, and the other subordinate control unit is a customer service control unit capable of controlling at least customer service mechanism and a vending control unit capable of controlling a vending mechanism.

5. The communication system for an automatic vending machine according to claim 4, wherein the communication speed of the customer service control unit and the vending control unit is faster than that of the communication speed of the coin mechanism control unit and the bill distinguishing control unit.

* * * * *